United States Patent
Stigers et al.

(10) Patent No.: US 10,259,721 B2
(45) Date of Patent: Apr. 16, 2019

(54) OIL FREE CRYSTAL GROWTH MODIFIERS FOR THE BAYER PROCESS

(71) Applicant: Cytec Industries Inc., Woodland Park, NJ (US)

(72) Inventors: Dannon Stigers, Milford, CT (US); Marie E. Anderson, Trumbull, CT (US)

(73) Assignee: Cytec Industries Inc., Woodland Park, NJ (US)

( * ) Notice: Subject to any disclaimer, the term of this patent is extended or adjusted under 35 U.S.C. 154(b) by 36 days.

(21) Appl. No.: 15/696,203

(22) Filed: Sep. 6, 2017

(65) Prior Publication Data

US 2018/0072583 A1 Mar. 15, 2018

Related U.S. Application Data

(60) Provisional application No. 62/385,561, filed on Sep. 9, 2016.

(51) Int. Cl.
| | | |
|---|---|---|
| *C01F 7/34* | (2006.01) |
| *C01F 7/02* | (2006.01) |
| *C01F 7/08* | (2006.01) |
| *C01F 7/14* | (2006.01) |

(52) U.S. Cl.
CPC ............ *C01F 7/34* (2013.01); *C01F 7/02* (2013.01); *C01F 7/08* (2013.01); *C01F 7/145* (2013.01)

(58) Field of Classification Search
CPC ...... C01F 7/34; C01F 7/02; C01F 7/08; C01F 7/145
See application file for complete search history.

(56) References Cited

U.S. PATENT DOCUMENTS

2015/0240325 A1 * 8/2015 Urbani ............... C02F 11/14
210/710

* cited by examiner

*Primary Examiner* — James A Fiorito

(57) ABSTRACT

Disclosed herein are methods of producing alumina trihydrate crystals from an alumina trihydrate recovery process stream wherein an aqueous emulsion comprising a crystal growth modifier, which is at least one of an acyclic anhydride or an alkyl or alkenyl succinic anhydride, is added to the alumina trihydrate recovery process stream, wherein the aqueous emulsion is substantially free of mineral oils. The method provides a decrease in percentage of alumina trihydrate crystals having a volume average diameter of less than about 45 micrometers compared to the percentage of alumina trihydrate crystals produced in the absence of the crystal growth modifier. The process does not require the addition of a defoamer/anti-foam agent in order to control foam generated in the process.

16 Claims, No Drawings

OIL FREE CRYSTAL GROWTH MODIFIERS FOR THE BAYER PROCESS

CROSS REFERENCE TO RELATED APPLICATIONS

This application claims the benefit of U.S. Provisional Patent Application No. 62/385,561, filed Sep. 9, 2016, incorporated herein by reference in its entirety.

BACKGROUND OF THE INVENTION

The present invention is directed towards a method of producing alumina trihydrate crystals from an alumina trihydrate recovery process stream. Production by the Bayer process involves the digestion of bauxite at high temperatures and pressures in caustic soda liquor, producing a saturated sodium aluminate solution (pregnant liquor) containing an insoluble ferruginous residue called "red mud". In the Sinter process, bauxite is combined with lime and heated to about 1200° C. prior to leaching with caustic soda liquor to generate a sodium aluminate liquor containing insoluble "sinter mud". Mud slurries generated in the above processes are treated with flocculants to flocculate and separate the muds from the pregnant liquor by gravity settling in thickener vessels (settlers). After settling, the clarified liquor (overflow) is removed from the top of the settler. At this point, the Sinter process often requires another step wherein a desilication additive such as lime is added to the overflow liquor to remove soluble silica from the liquor. This slurry is treated with flocculants and fed to a desilication settler to remove insoluble desilication products. The liquor is then further purified in a filtration process in order to remove suspended fine solids and other impurities.

The purified pregnant liquor—an example of an alumina trihydrate recovery process stream—is then cooled and seeded with fine alumina trihydrate crystals or neutralized with $CO_2$ gas in a precipitation process to produce alumina trihydrate as gibbsite crystals, followed by calcination to produce the final alumina product. In the Bayer process, precipitation of alumina trihydrate from supersaturated caustic aluminate solutions is the rate limiting step, taking up over half of the residence time in an alumina refinery. Precipitation does not take place under ideal conditions because the digestion of bauxite ore in refinery "spent" liquor results in a solution supersaturated in alumina, and which also contains significant amounts of organic and inorganic impurities. Precipitation is accelerated by the use of seed alumina trihydrate crystals.

Bayer process operators optimize precipitation to maximize yield while still obtaining high quality product having a target crystal size distribution. It is desirable to produce relatively large crystals as this facilitates subsequent processing steps. A large percentage of fine crystals (i.e., below 45 micrometers) are undesirable. However the presence of some fine crystals may be desirable for seeding purposes. The yield and properties of the alumina trihydrate crystals can be significantly affected by the process conditions used, such as temperature, residence time, and the nature of the seed crystal used, and these conditions can vary from plant to plant.

A crystal growth modifier (CGM) can be added to the alumina trihydrate recovery process stream to impose a deliberate modification of the alumina trihydrate crystals. A modification generally used is a reduction in the proportion of fines, and therefore, an increase in the average alumina trihydrate particle size. Crystal growth modifiers can be used to control particle size and strength. Not only must product quality crystals (≥45 micrometers) be produced, but sufficient seed crystals (<45 micrometers) are also needed to promote precipitation. Crystal growth modifiers can also enhance agglomeration by combining and cementing smaller particles. Crystal growth modifiers can also suppress or control primary nucleation (generation of new particles) and secondary nucleation (generation of new particles on surfaces of existing particles). A crystal growth modifier can modify the crystal particle size distribution, allowing the user to use a lower fill temperature and higher seed charge. Crystal growth modifiers can also be used to affect the morphology of oxalate crystals that often co-precipitate in the alumina trihydrate precipitation circuit.

Extensive efforts have been invested into finding effective crystal growth modifiers and methods of their use in optimizing crystal particle size. Many crystal growth modifiers (e.g., C18-fatty acids) require the addition of an oil or secondary surfactant to aid in dispersion of the CGM into pregnant liquor. Added oil or surfactant increases the impurity load in the liquor, negatively impacting precipitation yield, and may cause discoloration of the alumina trihydrate, which is highly undesirable.

Because of the organic content of Bayer liquor (predominantly humic substances), it has a natural tendency to foam. Foaming of the liquor is aggravated by the mixing steps in the Bayer process. Foaming is especially a problem after clarification (separation of the red mud) and during precipitation. The amount of pregnant liquor cannot be maximized in vessels partly filled with foam, and therefore maximum product throughput cannot be obtained. Foam also poses a safety hazard in that overflow can expose workers to high levels of caustic, which can cause severe chemical burns. Since foam is an insulator, reduction in foam can improve heat transfer efficiency. Reduction of foam can reduce scaling in precipitators and improve operation of alumina trihydrate classification systems due to reduced alumina trihydrate retention in foam.

In view of these factors, a way to economically reduce the generation of fine particles in the precipitation of alumina trihydrate is desirable. In particular, the method should provide a decrease in percentage of crystals having a volume average diameter of less than about 45 micrometers. The crystal growth modifier employed should be effective at low doses (i.e., less than about 100 milligrams per liter of pregnant liquor), and should be substantially free of ancillary oils or surfactants, thereby minimizing contamination and discoloration of the alumina trihydrate crystals. Moreover, foam generation in the method should also be minimized.

BRIEF DESCRIPTION OF THE INVENTION

An improved method of producing alumina trihydrate crystals from an alumina trihydrate recovery process stream is provided. The method comprises adding an aqueous emulsion comprising an alkyl or alkenyl succinic anhydride to the alumina trihydrate recovery process stream, wherein the aqueous emulsion is substantially free of mineral oils (e.g., paraffinic oil, naphthenic oil) and fuel oils. The alumina trihydrate crystals are crystallized from the alumina trihydrate recovery process stream, thereby providing a decrease in percentage of alumina trihydrate crystals having a volume average diameter of less than about 45 micrometers compared to the percentage of alumina trihydrate crystals produced in the absence of the aqueous emulsion of an alkyl or alkenyl succinic anhydride.

In a further embodiment, described herein are methods of producing alumina trihydrate crystals from an alumina trihydrate recovery process stream, the method comprising: adding an acyclic anhydride or an aqueous emulsion comprising an acyclic anhydride to the alumina trihydrate recovery process stream to facilitate crystallization of the alumina trihydrate crystals from the alumina trihydrate recovery process stream, wherein the aqueous emulsion is substantially free of mineral oils and fuel oils, thereby providing a decrease in percentage of alumina trihydrate crystals having a volume average diameter of less than about 45 micrometers compared to the percentage of alumina trihydrate crystals produced in the absence of the acyclic anhydride the aqueous emulsion of acyclic anhydride.

DETAILED DESCRIPTION OF THE INVENTION

A method of producing alumina trihydrate crystals from an alumina trihydrate recovery process stream provides a decrease in percentage of crystals having a volume average diameter of less than 45 micrometers. The method employs a crystal growth modifier which is effective at low doses (less than 100 milligrams per liter of pregnant liquor). Advantageously, the crystal growth modifier is provided neat (100% active ingredients) and is substantially free of ancillary oils or surfactants to minimize discoloration of the alumina trihydrate crystals. As another advantage, the crystal growth modifier is provided neat or in the form of an aqueous emulsion and is substantially free of ancillary oils or surfactants to minimize discoloration of the alumina trihydrate crystals, and/or free of defoamer or anti-foam agents. The effective amount at least one of an acyclic anhydride or an alkyl or alkenyl succinic anhydride is low enough to be economical and to minimize contamination of the alumina trihydrate crystals. The crystal growth modifier is added to alumina trihydrate recovery process streams as an aqueous emulsion. Moreover, foam generation in the method can be reduced with a defoamer.

The improved method of producing alumina trihydrate crystals in the Bayer process or an alumina recovery process stream comprises: adding an aqueous emulsion comprising an acyclic anhydride to the alumina trihydrate recovery process stream, wherein the aqueous emulsion is substantially free of mineral oils and fuel oils; whereby allowing alumina trihydrate crystals to crystalize from in the alumina trihydrate recovery process stream, thereby providing a decrease in percentage of alumina trihydrate crystals having a volume average diameter of less than about 45 micrometers compared to the percentage of alumina trihydrate crystals produced in the absence of the aqueous emulsion comprising an acyclic anhydride. As used herein, the term an alkyl or alkenyl succinic anhydride can collectively be abbreviated as "ASA". In one embodiment, the aqueous emulsion is substantially free of surfactants. In another embodiment, the aqueous emulsion is substantially free of defoamer or anti-foam agent.

The acyclic anhydride can have the structure:

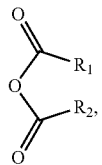

$R_1$ and $R_2$ are each independently a $C_xH_y$ group, wherein x is from 1 to 30, and y is $2x-1$ or $2x+1$.

Within this range, x can be from 6 to 24, 12 to 24, or 14 to 20. In one embodiment, $R_1$ and $R_2$ are each independently an alkyl or alkenyl group, which can be branched or unbranched. Examples of acyclic anhydrides include but are not limited to oleic anhydride, stearic anhydride, tetradecanoic anhydride, palmitic anhydride, arachidic anhydride, behenic anhydride, erucic anhydride, myristoleic anhydride, decanoic anhydride, 2-ethylhexanoic anhydride, palmitoleic anhydride and any combination thereof. In one particular embodiment, acyclic anhydrides include but are not limited to oleic anhydride, decanoic anhydride, 2-ethylhexanoic anhydride, or mixtures thereof.

The alkyl or alkenyl succinic anhydride can have the structure:

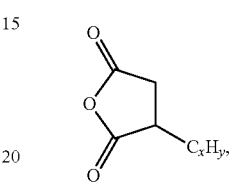

wherein x is from 1 to 30, and y is $2x-1$ or $2x+1$. Within this range, x can be from 6 to 24, 12 to 24, or 14 to 20. The alkyl and alkenyl groups can be branched or unbranched. Examples of alkyl or alkenyl succinic anhydrides include tetracocenyl succinic anhydride (C-24 ASA), eicosenyl succinic anhydride (C-20 ASA), n-octadecenyl succinic anhydride, (C-18 ASA), iso-octadecenyl succinic anhydride, n-hexadecenyl succinic anhydride (C-16 ASA), dodecenyl succinic anhydride (C-12 ASA), octenyl succinic anhydride, triisobutenyl succinic anhydride, tetrapropenyl succinic anhydride, and combinations thereof. Alkyl or alkenyl succinic anhydrides can be provided as mixtures, for example mixtures of one or more of C14-ASA, C-16 ASA, C18-ASA, and C-20 ASA can be used. In some embodiments, the alkyl or alkenyl succinic anhydride is a C14-C20 alkenyl succinic anhydride.

Alkenyl succinic anhydrides are produced by the reaction of internal alkenes with maleic anhydride at temperatures of about 200° C. Alkyl succinic anhydride can be produced by hydrogenation of alkenyl succinic anhydrides. The internal olefins can be produced by isomerization of alpha-olefins under thermodynamic conditions, or by acid-catalyzed oligomerization of alpha-olefins (e.g., triisobutene, tetrapropene). Alkyl or alkenyl succinic anhydrides can also be produced from vegetable oils (triglycerides) having a high content of mono-unsaturated fatty acid groups, for example oleic acid groups or esters produced during esterification of fatty acid or triglycerides. These alkenyl succinic anhydrides are referred to as "maleated triglycerides".

As used herein, "substantially free of" means less than about 5, 4, 3, 2, 1, or 0.1 weight percent (wt %) of the indicated material based on the total weight of the aqueous emulsion. In some embodiments "substantially free of" means that there is no measureable amount of the material.

In some embodiment, the aqueous emulsion is substantially free of mineral oils and fuel oils, including paraffinic oils and naphthenic oils, based on total weight of the aqueous emulsion. The mineral oil and fuel oil can have a boiling point of greater than about 93° C. (200° F.). Advantageously, the absence of mineral oils and fuel oils minimizes contamination and discoloration of the alumina trihydrate with organic material.

In some embodiment, the aqueous emulsion is substantially free of defoamers and anti-foam agents.

In some embodiments, the aqueous emulsion is substantially free of distillation bottoms from the production of alkyl alcohols by the oxo process (hydroformylation). The distillation bottoms are sometimes referred to as "heavy oxo fraction". The distillation bottoms can be high boiling, and can contain a mixture of alkyl alcohols, hydroformylation reactants (olefins), as well as ether and ester by-products.

In some embodiments, the aqueous emulsion is substantially free of surfactants. Surfactants are organic compounds that are amphiphilic, meaning they contain both hydrophobic groups ("tails") and hydrophilic groups ("heads"). The hydrophobic groups can comprise, for example, aliphatic, branched aliphatic, or alkylaromatic hydrophobes of about 8 to about 24 carbon atoms. In some embodiments, the aqueous emulsion is substantially free of polyalkoxylated non-ionic surfactants, fatty acids, fatty acid salts, or combinations thereof. Polyalkoxylated non-ionic surfactants are composed of ethylene oxide (EO) repeat units, propylene oxide (PO) repeat units, butylene oxide (BO) repeat units, and combinations thereof. The polyalkoxylated non-ionic surfactant can be a homopolymer, a random copolymer, an alternating copolymer, a periodic copolymer, a block copolymer, a graft copolymer, or a branched copolymer of EO, PO, BO, and combinations thereof. The polyalkoxylated non-ionic surfactant can be, for example, a poly(ethylene oxide-propylene oxide) block copolymer, commercially available under the trade names PLURONIC™ SYNPERONIC™ PE, DOWFAX™, and MONOLAN™.

The polyalkoxylated non-ionic surfactant can be an ethylene oxide, propylene oxide, and butylene oxide polymers and copolymers formed with alcohol, phenolic, or amine initiators. The alcohol can be, for example, a mono-, di-, tri- or tetrol. The alcohol can be, for example, a fatty alcohol. Polyalkoxylated non-ionic surfactants of this type are commercially available under the trade name PLURAFAC™. The diol can be ethylene glycol or propylene glycol and the triol can be glycerol or trimethylol propane. Polyalkoxylated non-ionic surfactants of this type are commercially available under the trade names UKANIL™ and DOWFAX™. The tetrols can be pentaerythritol. Polyalkoxylated non-ionic surfactants based on ethylene diamine are available under the trade name TETRONICS™. In polyalkoxylated non-ionic surfactants having ethylene oxide, propylene oxide, and butylene oxide repeat units, the amount of butylene oxide is about 1 to about 40 weight percent. The polyalkoxylated non-ionic surfactant can have a molecular weight of the EO/PO (and optionally BO) chain of about 600 Daltons or greater, specifically about 2,000 to about 5,000 Daltons.

Fatty acids are carboxylic acids (head) having a long alkyl or alkenyl chain (tail). Most naturally occurring fatty acids have an even number chain of from about 4 to about 28 carbon atoms. The fatty acid can be a mixture of fatty acids having different even carbon chain lengths. For example, the fatty acid can be a mixture of $C_6$, $C_8$, $C_{10}$ and $C_{12}$ fatty acids, or it can be tall oil, which is mainly composed of oleic acid. The fatty acid can be present as its conjugate base (e.g., as metal or ammonium carboxylate salts), which are formed in situ in the presence of alkali.

As described above, production of alumina from bauxite is done by the Bayer process, Sinter process, or various combinations of the two. Production by the Bayer process involves the digestion of bauxite at high temperatures and pressures in a caustic soda solution to produce a caustic saturated sodium aluminate solution containing an insoluble ferruginous residue called "red mud". A caustic sodium aluminate solution—"pregnant liquor"—is obtained after removal of the red mud, fine suspended solids and other impurities. Caustic pregnant liquor from the Bayer process is an example of an alumina trihydrate recovery process stream. Thus, in some embodiments, the alumina trihydrate recovery process stream is a caustic Bayer process stream. Alumina trihydrate crystals are precipitated from the resulting caustic sodium aluminate solution (pregnant liquor). Thus, in some embodiments, the aqueous emulsion of the crystal growth modifiers (CGM) is added after red mud separation and prior to isolation of alumina trihydrate crystals. As used herein, crystal growth modifier(s) (otherwise referred to herein as "CGM") means, in one embodiment, at least one acyclic anhydride or, in another embodiment, means at least one alkyl or alkenyl succinic anhydride or, in yet another embodiment, a mixture of at least one acyclic anhydride and at least one alkyl or alkenyl succinic anhydride. It is understood that the terms "crystal growth modifier" and "crystal growth modifiers" can be used interchangeably herein.

Alkyl or alkenyl succinic anhydrides and/or acyclic anhydrides are crystal growth modifiers which can be added to alumina trihydrate recovery process streams to modify alumina trihydrate crystals. Crystal growth modifiers can be used to control particle size and strength. A modification generally used is a reduction in the proportion of fines, and therefore, an increase in the average alumina trihydrate particle size. An overall increase in average alumina trihydrate crystal size is desirable as it reduces energy consumption and makes the process more economical. For example, an increase in alumina trihydrate crystal size can facilitate isolation of the crystals from the alumina trihydrate recovery process stream. Volume average diameters of less than about 45 micrometers and less than about 20 micrometers are useful parameters. Advantageously, the method of producing alumina trihydrate crystals from an alumina trihydrate recovery process stream provides a decrease in percentage of alumina trihydrate crystals having a volume average diameter of less than about 45 micrometers compared to the percentage of alumina trihydrate crystals produced in the absence of the aqueous emulsion of crystal growth modifiers. The method can also provide a decrease in percentage of alumina trihydrate crystals having a volume average diameter of less than 20 micrometers compared to the percentage of alumina trihydrate crystals produced in the absence of the aqueous emulsion of crystal growth modifiers.

Crystal growth modifiers can be added to the alumina trihydrate recovery process stream as an aqueous emulsion. The aqueous emulsion can be an oil-in-water emulsion, where the oil in this case is the active ingredient (i.e., an acyclic anhydride and/or an alkyl or alkenyl succinic anhydride). Advantageously, the aqueous emulsion can be formed in the absence of mineral oil and fuel oil as co-solvents or diluents, thereby minimizing organic contamination of the alumina trihydrate crystals. In another embodiment, the aqueous emulsion can be formed in the absence of defoamers and/or anti-foam agents. In some embodiments, the crystal growth modifier droplets in the aqueous emulsion have a volume average particle diameter of about 1 to about 100 micrometers ('µm'), about 1 to about 50 µm, or about 10 to about 50 µm.

In some embodiments, the aqueous emulsion is prepared with a high shear mixer. For example, on a laboratory scale, the aqueous emulsion can be prepared using a Polytron PT-2100 homogenizer, equipped with a 12-millimeter aggregate stirring shaft and operating at 11,000, 19,000, and 26,000 revolutions per minute ('rpm').

Aqueous emulsions of the crystal growth modifiers according to the invention can be prepared at convenient concentrations. For example, the amount of crystal growth modifiers can be from about 0.1 to about 25 grams per 100 milliliters, or about 1 to about 10 grams per 100 milliliters. Thus in some embodiments, the aqueous emulsion comprises from about 0.1 to about 20 grams per 100 milliliters of crystal growth modifiers.

The aqueous emulsion of crystal growth modifiers can be added to an alumina trihydrate recovery process stream in an amount effective to decrease the percentage of alumina trihydrate crystals having a volume average diameter of less than about 45 micrometers compared to the percentage of alumina trihydrate crystals produced in the absence of the aqueous emulsion of crystal growth modifiers. Advantageously, the effective amount of crystal growth modifiers is small enough to be economical and minimize contamination of the alumina trihydrate crystals.

As used herein, the amount of crystal growth modifiers added to the alumina trihydrate recovery process stream is defined as the "dose", which is expressed in units of milligrams crystal growth modifiers per liter of alumina trihydrate recovery process stream. The crystal growth modifier can be added at a dose of from about 0.1 to about 100 milligrams per liter of alumina trihydrate recovery process stream, from about 1 to about 50 milligrams per liter of alumina trihydrate recovery process stream, or from about 2 to about 20 milligrams per liter of alumina trihydrate recovery process stream.

Advantageously, the crystal growth modifier provides the beneficial effect of increasing average alumina trihydrate particle size without adversely affecting the yield of alumina trihydrate crystals. The crystal growth modifier can have its greatest effect in the early stages of precipitation of alumina trihydrate crystals from the alumina trihydrate recovery process stream. Thus in some embodiments, the alumina trihydrate yield after about 5 hours crystallizing time is not decreased by addition of the aqueous emulsion to the alumina trihydrate recovery process stream. Total crystallizing time in the Bayer process can be greater than 24 hours in a refinery.

Foam can occur in the crystallizing step in alumina trihydrate production, wherein the alumina trihydrate recovery process stream is agitated. Foam is a stable dispersion of air in a liquid (here, a stable dispersion of air in the alumina trihydrate recovery process stream). Foam is generated by the introduction of air into the alumina trihydrate recovery process stream by agitation. The bubbles produced tend to assume a spherical shape, and since they are lighter than the liquid phase, rise to the liquid-air interface. Foam reduces the effective volume of crystallizing vessels by occupying head space above the liquid. Foam can also interfere with liquid transfer operations (e.g., pumping).

Defoamers can be added to the alumina trihydrate recovery process stream to reduce the formation of foam. Suitable defoamers include polypropylene oxide (also known as polypropylene glycol), polypropylene oxide mono-C1-C6 alkyl ethers (also known as polypropylene glycol mono-C1-C6 alkyl ethers), polyethylene oxide (also known as polyethylene glycol), polyethylene oxide mono-C1-C6 alkyl ethers (also known as polyethylene glycol mono-C1-C6 alkyl ethers), polysiloxanes, organic-modified polysiloxanes, hydrophobic silica particles, distillation bottoms from the oxo process, or combinations thereof. In one embodiment, he defoamer can be added to the alumina trihydrate recovery process stream together with the crystal growth modifier.

The defoamer can be combined with the alkyl or alkenyl succinic anhydride in the aqueous emulsion. Thus, in some specific embodiments, the aqueous emulsion further comprises a defoamer chosen from polypropylene oxide, polypropylene oxide mono-C1-C6 alkyl ethers, polyethylene oxide, polyethylene oxide mono-C1-C6 alkyl ethers, polysiloxanes, organic-modified polysiloxanes, hydrophobic silica particles, distillation bottoms from the oxo process, or combinations thereof. While the alkyl or alkenyl succinic anhydride can be added in an amount effective to increase the average size of the alumina trihydrate crystals, the defoamer can be added in an amount effective to reduce foam in the aqueous emulsion and/or alumina trihydrate recovery process stream. However, in some particular embodiments, the acyclic anhydride is added in an amount effective to increase the average size of the alumina trihydrate crystals and at the same time reduce foam without the need to add defoamer or anti-foam agent.

In some embodiments, the weight ratio of the alkyl or alkenyl succinic anhydride to defoamer is from about 100:1 to about 1:1. Within this range, the weight ratio of alkyl or alkenyl succinic anhydride to defoamer can be from about 20:1 to about 1:1, about 10:1 to about 1:1, about 5:1 to about 1:1, or about 3:1 to about 1:1.

The method of producing alumina trihydrate crystals from an alumina trihydrate recovery process stream provides a decrease in percentage of crystals having a volume average diameter of less than about 45 micrometers. The method employs a crystal growth modifier which is effective at low doses (i.e., less than about 100 milligrams per liter of pregnant liquor). Advantageously, the crystal growth modifier is provided neat (100% active ingredients) and is substantially free of ancillary oils or surfactants to minimize discoloration of the alumina trihydrate crystals. The effective amount of crystal growth modifiers is low enough to be economical and to minimize contamination of the alumina trihydrate crystals. The crystal growth modifier can be added to alumina trihydrate recovery process streams as an aqueous emulsion. Moreover, foam in the alumina trihydrate recovery process stream can be reduced with a defoamer, in some particular embodiments.

This invention includes at least the following embodiments.

In general, the present invention is directed towards a method of producing alumina trihydrate crystals from an alumina trihydrate recovery process stream. This method includes the steps of adding an aqueous emulsion comprising one or more crystal growth modifiers to the alumina trihydrate recovery process stream, wherein the aqueous emulsion is substantially free of mineral oils (e.g., paraffinic oil, naphthenic oil) and fuel oils; thereby allowing or promoting crystallization of alumina trihydrate crystals from the alumina trihydrate recovery process stream. This provides a decrease in the percentage of alumina trihydrate crystals having a volume average diameter of less than about 45 micrometers compared to the percentage of alumina trihydrate crystals produced in the absence of the aqueous emulsion of at least one crystal growth modifiers.

In one embodiment, the aqueous emulsion is substantially free of surfactants. In one embodiment, the aqueous emulsion is substantially free of defoamer and anti-foam agents.

In another embodiment, the aqueous emulsion is substantially free of polyalkoxylated non-ionic surfactants, fatty acids, fatty acid salts, and a combination thereof.

In one embodiment, the aqueous emulsion has a volume average particle diameter of about 1 to about 100 micrometers. Preferably, the aqueous emulsion has a volume average particle diameter of about 1 to about 50 micrometers. In another embodiment, the aqueous emulsion has a volume average particle diameter of about 10 to about 50 micrometers.

In one embodiment, the crystal growth modifier used in the method described above is an alkyl or alkenyl succinic anhydride having the structure:

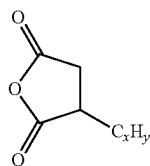

(I)

wherein x is from 1 to 30, and y is 2x−1 or 2x+1.

In one embodiment, the alkyl or alkenyl succinic anhydride is a $C_{14}$-$C_{24}$ alkenyl succinic anhydride.

In one embodiment, the crystal growth modifier used in the method described above is an acyclic anhydride having the structure:

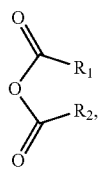

wherein $R_1$ and $R_2$ are each independently a $C_xH_y$ group, wherein x is from 1 to 30, and y is 2x−1 or 2x+1. Within this range, x can be from 6 to 24, 12 to 24, or 14 to 20. In one embodiment, $R_1$ and $R_2$ are each independently an alkyl or alkenyl group, which can be branched or unbranched. Examples of acyclic anhydrides include but are not limited to oleic anhydride, stearic anhydride, tetradecanoic anhydride, palmitic anhydride, arachidic anhydride, behenic anhydride, erucic anhydride, myristoleic anhydride, decanoic anhydride, 2-ethylhexanoic anhydride, palmitoleic anhydride and any combination thereof. In one particular embodiment, acyclic anhydrides include but are not limited to oleic anhydride, decanoic anhydride, 2-ethylhexanoic anhydride, or mixtures thereof.

In one embodiment, the aqueous emulsion is substantially free of distillation bottoms from the oxo process (hydroformylation).

The aqueous emulsion used in the method described above can further include a defoamer. The defoamer can be polypropylene oxide, polypropylene oxide mono-$C_1$-$C_6$ alkyl ethers, polyethylene oxide, polyethylene oxide mono-$C_1$-$C_6$ alkyl ethers, polysiloxanes, organic-modified polysiloxanes, hydrophobic silica particles, distillation bottoms from the oxo process, or combinations thereof.

In the embodiment wherein a defoamer is added to the aqueous emulsion, the weight ratio of alkyl or alkenyl succinic anhydride to defoamer is from 100:1 to 1:1.

In one embodiment, the alumina trihydrate recovery process stream is a caustic Bayer process stream.

In one embodiment, the aqueous emulsion is added after red mud separation and prior to isolation of alumina trihydrate crystals.

In one embodiment, the aqueous emulsion is prepared with a high shear mixer.

In one embodiment, the alkyl or alkenyl succinic anhydride is added at a dose from about 0.1 to about 100 milligrams per liter of alumina trihydrate recovery process stream.

In one embodiment, the alkyl or alkenyl succinic anhydride or emulsion is added at a directly into the Bayer Process stream. It is understood that in some embodiments, the emulsion includes the defoamer or anti-foam agent. In some embodiments, the Bayer process stream includes the seed slurry and pregnant liquor.

In one embodiment, the aqueous emulsion comprises from about 1 to about 20 milligrams per 100 milliliters of crystal growth modifier.

In one embodiment, the alumina trihydrate yield after about 5 hours crystallizing time is not decreased by addition of the aqueous emulsion to the alumina trihydrate recovery process stream.

This invention is further illustrated by the following non-limiting examples.

EXAMPLES

Materials used in Examples 1-8 are described in Table 1.

TABLE 1

Description of Materials Used in Examples 1-8.

| Substance | Chemical Description and Source |
|---|---|
| C18-ASA | $C_{18}$ alkenyl succinic anhydride, or dihydro-3-(octadecenyl)-2,5-furandione, available from Dixie Chemicals. |
| C18-ASA Emulsion | 5 g/100 mL C18-ASA in deionized water at pH 3.5. |
| C18-FA | $C_{18}$ fatty acid, available from Arizona Chemical as SYLFAT ™ FA1. |
| DF225 | Alumina trihydrate, available from R. J. Marshall as DF225, having 60% fines (<45 μm) (Alcoa C-31 equivalent). |
| Commercial Product A | $C_{18}$ fatty acid, 15 g/100 mL in oil. |
| Commercial Product B | $C_{18}$ fatty acid, 15 g/100 mL in oil. |
| Defoamer | Liquid, glycol ether-based defoaming reagent, available from Cytec Industries as CYBREAK ™ 632. |

Each test was run using spent liquor samples A or B (obtained from two different alumina plants) reconstituted to pregnant liquor by adding alumina and dissolving it at 145° C. The pregnant liquor comprised 165 g/L±10 g/L alumina (A, expressed as $Al_2O_3$), 230 g/L±10 g/L caustic soda (C, expressed as $Na_2CO_3$), and 320 g/L±10 g/L total soda (S, expressed as $Na_2CO_3$), wherein the A/C ratio was 0.72. (A/C ratios in pregnant liquor are generally in the range of 0.68 to 0.72.)

C18-ASA Emulsions were prepared by weighing out the required amounts of deionized water (adjusted to a pH of 3.5 with sulfuric acid) and C18-ASA or C18-ASA and defoamer. The amounts used were calculated to give a 5 g/100 mL C18-ASA emulsion. The water was added first, and then the C18-ASA. The mixture was then homogenized for 1 minute (min.) at 19,000 revolutions per minute (19 k rpm) using a Polytron PT-2100 homogenizer, equipped with a 12-millimeter aggregate stirring shaft, unless otherwise stated.

Precipitation tests were performed in 250-mL NAL-GENE™ bottles rotated end-over-end at approximately 15 rpm in a temperature controlled water bath (Thornton Engineering) at either 50° C. or 70° C. In the tests, 200 mL of pregnant liquor was added to the bottles. CGM was then mixed into the pregnant liquor. All the bottles were tightly sealed and placed into the water bath for 15-20 minutes at 50° C. or 70° C. to allow the samples to come to equilibrium. After equilibrium, the bottles were removed and charged with the designated quantity of seed alumina trihydrate and returned to the water bath. The bottles were rotated for 5 hours (hr.) or 18 hr. at the desired temperature.

After precipitation of alumina trihydrate for 5 or 18 hr., the bottles were removed from the water bath one at a time, and a 15 mL sample was removed for liquor analysis. 2-3 drops of sodium gluconate solution (400 g/L) were added to this sub-sample to prevent further precipitation from the liquor. The remaining slurry sample was immediately filtered and the solids were collected by vacuum filtration, and then thoroughly washed with hot deionized water and dried at 105° C. Volume average diameter was determined on a Horiba LA 920 light scattering instrument using a laser diffraction method that is well known in the art. The effect of the CGM on particle size distribution was determined by comparing the amounts (%) of particles below 45 μm (fines) and below 20 μm (super-fines) in the precipitated product from CGM-treated pregnant liquor versus commercially available crystal growth modifier-treated pregnant liquors and untreated control pregnant liquor.

Example 1 and Comparative Examples 1-3

Alumina trihydrate crystal growth from pregnant liquor reconstituted from spent liquor A was evaluated in the presence of C18-ASA, C18-FA, and C18-ASA emulsion at doses of 5, 10, and 15 parts per million (ppm) real each. Units of parts per million (ppm) are on a mg/L basis. 50 g/L of DF225 was added as seed crystal. Precipitation was conducted at 70° C. for 5 hrs. The results are summarized in Table 2.

TABLE 2

Comparative effect of ASA emulsion against ASA neat

| | Crystal Growth Modifier | Dose, ppm (real) | % Fines (<45 μm) | % Super fines (<20 μm) |
|---|---|---|---|---|
| C. Ex. 1 | None | 0 | 62.1 | 12.3 |
| C. Ex. 2 | C18-ASA Neat | 5 | 62.85 | 11.45 |
| | | 10 | 64.35 | 13.1 |
| | | 15 | 64.3 | 14.15 |
| C. Ex. 3 | C18-FA Neat | 5 | 62.05 | 14.35 |
| | | 10 | 63.1 | 15.1 |
| | | 15 | 62.8 | 15.2 |
| Ex. 1 | C18-ASA Emulsion | 5 | 61.55 | 11.9 |
| | | 10 | 61.15 | 12.15 |
| | | 15 | 59.8 | 12 |

As can be seen from Table 2, adding neat CGM as in Comparative Examples 2 (neat C18-ASA) and 3 (neat C18-FA) resulted in increased levels of fines (negative result) as compared to emulsified C18-ASA, Example 1, which lowered the amount of fines (positive result).

Example 2 and Comparative Examples 4-6

Alumina trihydrate crystal growth from pregnant liquor reconstituted from spent liquor A was evaluated in the presence of Commercial Product A, Commercial Product B, and C18-ASA emulsion at doses of 1.5, 3, 4.5, 6, and 7.5 ppm real each. 50 g/L of DF225 was added as seed crystal. Precipitation was conducted at 50° C. for 5 hrs. The results are summarized in Table 3.

TABLE 3

Comparative effect of ASA emulsion against ASA in oil

| | Crystal Growth Modifier | Dose ppm (real) | % Fines (<45 μm) | % Super fines (<20 μm) | Yield (g/L) |
|---|---|---|---|---|---|
| C. Ex. 4 | None | 0 | 52.95 | 4.7 | 40.15 |
| Ex. 2 | C18-ASA Emulsion | 1.5 | 47.7 | 3.05 | 41.20 |
| | | 3 | 42.95 | 2.3 | 40.83 |
| | | 4.5 | 42.05 | 2.3 | 41.26 |
| | | 6 | 39.4 | 2.15 | 41.27 |
| | | 7.5 | 38.3 | 1.9 | 40.76 |
| C. Ex. 5 | Commercial Product A | 1.5 | 51.45 | 3.55 | 40.03 |
| | | 3 | 48.65 | 3.2 | 39.99 |
| | | 4.5 | 46.8 | 2.85 | 39.97 |
| | | 6 | 41.75 | 2.25 | 40.03 |
| | | 7.5 | 38 | 1.85 | 40.46 |
| C. Ex. 6 | Commercial Product B | 1.5 | 48.75 | 3.2 | 37.94 |
| | | 3 | 43.1 | 2.3 | 38.28 |
| | | 4.5 | 39.7 | 2 | 37.44 |
| | | 6 | 37.9 | 1.85 | 37.99 |
| | | 7.5 | 38.45 | 1.85 | 38.19 |

Yield was calculated from the difference in the A/C values before and after precipitation, multiplied by C after precipitation:

$$\text{Yield} = (\Delta A/C) = ([A/C]_{initial} - [A/C]_{final}) \times C_{final}$$

As can be seen from Table 3, C18-ASA Emulsion can have a positive effect on yield, while Commercial Products A and B tend to decrease yield. These data demonstrate that on a real or active component basis, C18-ASA Emulsion performance is equal or better than commercial CGM's. An advantage of C18-ASA is its much higher solids content (neat), and thus lower dosage requirements, than Commercial Products A and B, having only 15 g/100 mL CGM.

Examples 3-5 and Comparative Example 7

Alumina trihydrate crystal growth from pregnant liquor reconstituted from spent liquor A was evaluated in the presence of a C18-ASA/defoamer emulsion at the C18-ASA doses indicated in Table 4 below. C18-ASA and defoamer (CYBREAK™ 632) in a 90:10 weight ratio were emulsified in deionized water adjusted to pH 3.5 with sulfuric acid to give an emulsion having 5 g/100 mL C18-ASA and 0.56 g/100 mL defoamer. Emulsification conditions are provided in Table 4. 50 g/L of DF225 was added to the pregnant liquor as seed crystal, and precipitation was conducted at 50° C. for 18 hrs. The results are summarized in Table 4.

TABLE 4

Effect of Defoamer on ASA Emulsion performance.

| | Emulsification Conditions | Volume Avg. Particle Diam. of Emulsion (μm) | C-18 ASA Dose (ppm real) | % Fines (<45 μm) | % Super Fines (<20 μm) |
|---|---|---|---|---|---|
| C. Ex. 7 | None | — | 0 | 50.15 | 1.25 |
| | | | 2.7 | 46.25 | 1.1 |
| Ex. 3 | 11k rpm, 1 min. | 48.8 | 5.4 | 44.7 | 1 |
| | | | 8.1 | 34.9 | 0.85 |
| | | | 2.7 | 34.05 | 0.8 |

TABLE 4-continued

Effect of Defoamer on ASA Emulsion performance.

| | Emulsification Conditions | Volume Avg. Particle Diam. of Emulsion (μm) | C-18 ASA Dose (ppm real) | % Fines (<45 μm) | % Super Fines (<20 μm) |
|---|---|---|---|---|---|
| Ex. 4 | 19k rpm, 1 min. | 29.4 | 5.4 | 34.6 | 0.9 |
| | | | 8.1 | 41.6 | 0.95 |
| | | | 2.7 | 42.2 | 0.95 |
| Ex. 5 | 26k rpm, 1 min. | 14.4 | 5.4 | 42.75 | 0.95 |
| | | | 8.1 | 35.75 | 0.8 |

These data show that C18-ASA/defoamer emulsions with emulsion droplet sizes in the range of about 14 to 50 micrometers (volume average particle diameter) are effective in reducing the percentage of fines compared to untreated pregnant liquor.

Examples 6-8 and Comparative Example 8

The C18-ASA can result in increased foam during agitation with pregnant liquor. The effect of C18-ASA and defoamers on foam generation was evaluated in the presence of C18-ASA at a dose of 3 ppm (Examples 6-8). C18-ASA was added as a 5 g/100 mL emulsion. In Example 7, C18-ASA was added in a 90:10 weight/weight mixture with defoamer (CYBREAK™ 632) to give a defoamer dose of 0.33 ppm; and in Example 8, C18-ASA was added in a 75/25 weight/weight mixture with defoamer to give a defoamer dose of 1 ppm.

Spent liquor B was reconstituted to pregnant liquor by adding alumina trihydrate and dissolving (as above). The pregnant liquor composition was also the same. 125 g/L of fine alumina trihydrate seed was added to 400 mL of hot pregnant liquor (90° C.), and the resulting mixture was shook. The resulting slurry was poured into a 1-L graduated cylinder placed in a water bath at 70° C. The slurry temperature was allowed to equilibrate to 70° C. and checked internally with a thermometer at approximately 30 minutes. The slurry was kept in suspension by means of a magnetic stir bar placed in the bottom of the graduated cylinder. The dose of CGM/defoamer was placed on the end of a stainless steel rod and immersed into the hot slurry with agitation. CGM/defoamer blends were prepared as 5% ASA emulsions as described above. The treated slurry was then allowed to mix and come to equilibrium for 2 min. (conditioning step). A gas dispersion tube (sparger) was then immersed in the slurry to a depth of ~1 inch from the bottom of the cylinder. Air was introduced into the pregnant liquor via the sparger, generating air bubbles in the pregnant liquor. The height of the resulting foam head was then monitored as a function of time. By comparing the rate of foam generation of the chemically treated slurry to untreated slurry, the efficacy of the treatment to reduce foam was evaluated. The results are summarized in Table 5.

TABLE 5

Effect of Defoamer

| | Crystal Growth Modifier | Rate of Foam Generation (mL/s) |
|---|---|---|
| C. Ex. 8 | None | 2.23 |
| Ex. 6 | C18-ASA Emulsion | 2.59 |

TABLE 5-continued

Effect of Defoamer

| | Crystal Growth Modifier | Rate of Foam Generation (mL/s) |
|---|---|---|
| Ex. 7 | C18-ASA Emulsion + 10% Defoamer | 1.47 |
| Ex. 8 | C18-ASA Emulsion + 25% Defoamer | 1.38 |

As can be seen from Table 5, defoamer can reduce the rate of foam generated in the presence of C18-ASA emulsion and also relative to untreated pregnant liquor.

Examples 9-17 and Comparative Examples 9 and 10

Each test was run using spent liquor obtained from an aluminum plant and reconstituted to pregnant liquor by adding alumina trihydrate to the plant spent liquor and dissolving at 145° C. Typical starting A/C ratio for the pregnant liquors used was in the range of 0.68-0.72.

The precipitation tests were performed in 250 mL Nalgene bottles rotated end-over-end at ~15 rpm in a temperature controlled water bath (Thornton Engineering) at 50° C. 200 mL of pregnant liquor was added to the bottles. The CGM was then dosed to the appropriate bottles and then all the bottles were tightly sealed and placed into the water bath for 15-20 minutes to allow the samples to come to equilibrium. After equilibrium, the bottles were removed and charged with the required quantity of seed and returned to the water bath. The bottles were rotated 18 hrs at the stated temperature.

The CGM was prepared by weighing out the required amounts of deionized water (adjusted to a pH of 3.5 with sulfuric acid) and ASA or ASA/defoamer/anti-foam blend. The amounts used are calculated to give a 5% ASA emulsion. The water was added first, and then the ASA. The mixture was then homogenized for 1 minute at 19K rpm, unless otherwise stated.

After the precipitation time was complete, the bottles were removed from the water bath, one at a time, and a 15 mL sample was removed for liquor analysis. 2-3 drops of sodium gluconate solution (400g/L) was added to this sub-sample to prevent further precipitation of the liquor. The remaining slurry sample was immediately filtered and the solids were collected by vacuum filtration and then thoroughly washed with hot deionized water, finally dried at 105° C. The particle size distribution of the solids was determined on a Horiba LA 920 light scattering instrument using a laser diffraction method that is well known in the art. The effect of the CGM on the particle size distribution is determined by comparing the amount (%) of particles below 45 μm (the fines) in the new CGM treated precipitated product vs. an un-dosed control sample and/or commercially available products.

Typical Pregnant liquor composition:

A: 165 g/L±10 g/L (as $Al_2O_3$)

C: 230 g/L±10 g/L (as $Na_2CO_3$)

S: 320 g/L±10 g/L (as $Na_2CO_3$)

A/C: 0.72

TABLE 6 below describes the ASA's used in EXAMPLES 9-17:

| Product | Supplier | Composition |
|---|---|---|
| ASA A | Dixie, ASA 100 | C16-ASA, 3-(hexadecenyl)dihydro-2,5-Furandione |
| ASA B | Dixie, ASA 2024 | C20/C24 mixture, n-eicosane succinic anhydride/n-tetracosane succinic anhydride |
| ASA C | Electron Microscopy Sciences (EMS), DDSA | C12 ASA, dihydro-3-(tetrapropenyl)-2,5-Furandione |
| ASA D | Aldrich | C9-ASA, (2-nonen-1-yl) succinic anhydride |
| ASA E | Electron Microscopy Sciences (EMS) | Mainly C9-ASA, (2-nonen-1-yl) succinic anhydride |
| ASA F | Tokyo Chemical Ind. (TCI) | C8-ASA, dihydro-3-(octenyl)-2,5 Furandione |
| ASA F | Tokyo Chemical Ind. (TCI) | C8-ASA, dihydro-3-(octenyl)-2,5 Furandione |

Conditions used for EXAMPLES 9-12 and Comparative example 9:

Temperature=50° C.

Precipitation time=18 h

Liquor: Reconstituted pregnant liquor using plant spent liquor A

Seed: DF225 from RJ Marshall & Co. (60% fines, Alcoa-C31 equivalent)

Seed charge: 50 g/L

The results for EXAMPLES 9-12 and Comparative example 9 are shown in Table 7 below.

TABLE 7

| Example | Crystal Growth Modifier | Dose, ppm (real) | % Fines (−45μ) | % Super fines (−20μ) |
|---|---|---|---|---|
| C. Ex. 9 | None | 0 | 58.28 | 11.41 |
| EXAMPLE 9 | C18-ASA Emulsion | 1.5 | 56.0 | 10.6 |
|  |  | 3 | 53.9 | 9.4 |
|  |  | 4.5 | 50.2 | 8.1 |
| EXAMPLE 10 | ASA A Emulsion | 1.5 | 51.1 | 8.6 |
|  |  | 3 | 50.4 | 8.4 |
|  |  | 4.5 | 52.7 | 8.4 |
| EXAMPLE 11 | ASA B Emulsion | 1.5 | 51.9 | 7.7 |
|  |  | 3 | 50 | 9.0 |
|  |  | 4.5 | 48.7 | 9.9 |
| EXAMPLE 12 | ASA C Emulsion | 1.5 | 52.3 | 9.6 |
|  |  | 3 | 47.9 | 7.9 |
|  |  | 4.5 | 52.9 | 9.6 |

Conditions used for EXAMPLE 13-17 and Comparative example 10:

Temperature=50° C.

Precipitation time=18 h

Liquor: Reconstituted pregnant liquor using plant spent liquor A

Seed: DF225 from RJ Marshall & Co. (60% fines, Alcoa-C31 equivalent)

Seed charge: 50 g/L

The results are shown in Table 8.

TABLE 8

| Example | Crystal Growth Modifier | Dose, ppm (real) | % Fines (−45μ) | % Super fines (−20μ) |
|---|---|---|---|---|
| C Ex. 10 | None | 0 | 67.6 | 5.8 |
| EXAMPLE 13 | C18-ASA Emulsion | 1.5 | 63.7 | 4.55 |
|  |  | 3 | 64.9 | 5.1 |
|  |  | 4.5 | 61.7 | 4.6 |
| EXAMPLE 14 | ASA C Emulsion | 1.5 | 63.8 | 5.4 |
|  |  | 3 | 60.6 | 4.5 |
|  |  | 4.5 | 64.8 | 5.5 |
| EXAMPLE 15 | ASA D Emulsion | 1.5 | 68.6 | 6.3 |
|  |  | 3 | 70.8 | 7.5 |
|  |  | 4.5 | 64.3 | 5.4 |
| EXAMPLE 16 | ASA E Emulsion | 1.5 | 67.7 | 6.5 |
|  |  | 3 | 65.1 | 5.7 |
|  |  | 4.5 | 62.3 | 5.2 |
| EXAMPLE 17 | ASA F Emulsion | 1.5 | 65.7 | 5.6 |
|  |  | 3 | 62.6 | 5.2 |
|  |  | 4.5 | 62 | 5.0 |

The results shown in Tables 7 and 8 show that ASA's containing a range of alkyl/alkenyl chain lengths can be used in the process of the invention.

Examples 18-21 and Comparative Examples 11-13

Each test was run using spent liquor obtained from an aluminum plant and reconstituted to pregnant liquor by adding alumina trihydrate to the plant spent liquor and dissolving at 145° C. Typical starting A/C ratio for the pregnant liquors used was in the range of 0.68-0.72.

The acyclic anhydride was prepared by weighing out the required amounts of deionized water (adjusted to a pH of 10 with NaOH solution) and oleic anhydride. The amounts used are calculated to give a 5% oleic anhydride emulsion. The water was added first, and then the reagent. The mixture was then homogenized with a Polytron PT 2100 homogenizer for 1 minute at 19K rpm. This emulsion was dosed directly into the Bayer liquor as an emulsion. This procedure was also followed to prepare octadecenylsuccininc anhydride as well. This emulsion was dosed directly into the Bayer liquor as an emulsion. Competitive samples are directly added to the pregnant liquor described below without the need for emulsification.

The precipitation tests were performed in 250 mL Nalgene bottles rotated end-over-end at ~15 rpm in a temperature controlled water bath (Thornton Engineering) at either 50° C. or 70° C. 200 mL of pregnant liquor was added to the bottles. The acyclic anhydride was then dosed to the appropriate bottles and then all the bottles were tightly sealed and placed into the water bath for 15-20 minutes to allow the samples to come to equilibrium. After equilibrium, the bottles were removed and charged with the required quantity of seed and returned to the water bath. The bottles were rotated for 5hrs or 18 hrs at the desired temperature. After the precipitation time was complete, the bottles were removed from the water bath, one at a time, and a 15 mL sample was removed for liquor analysis. 2-3 drops of sodium gluconate solution (400 g/L) was added to this sub-sample to prevent further precipitation of the liquor. The remaining slurry sample was immediately filtered and the solids were collected by vacuum filtration and then thoroughly washed with hot deionized water, finally dried at 105° C. The particle size distribution of the solids was determined on a Horiba LA 920 light scattering instrument using a laser diffraction method that is well known in the art. The effect of the CGM on the particle size distribution is determined by comparing the amount (%) of particles below 45 μm (the fines) in the new CGM treated precipitated product versus an un-dosed control sample and/or commercially available products.

Typical Pregnant liquor composition:
A: 165 g/L±10 g/L (as $Al_2O_3$)
C: 230 g/L±10 g/L (as $Na_2CO_3$)
S: 320 g/L±10 g/L (as $Na_2CO_3$)
A/C: 0.72

Conditions used for EXAMPLES 18-19 and Comparative Examples 11
Temp=50 C
Precip time=18 hours
Liquor: Plant Liquor A
Seed: DF225 from RJ Marshall & Co. (60% fines, Alcoa-C31 equivalent)
Seed Charge: 50 g/L
CGM: Oleic anhydride (TCI)

Results for EXAMPLES 18-19 and Comparative Examples 11 are shown in Table 9, below.

TABLE 9

Comparison of the neat addition vs. emulsified addition of an acyclic anhydride.

| | Crystal Growth Modifier | Dose real (ppm) | % Fines (<45 micron) |
|---|---|---|---|
| C Ex. 11 | None | 0 | 11.9 |
| Ex. 18 | 5% Oleic Anhydride Emulsion | 1.5 | 9.8 |
| | | 5 | 9.7 |
| | | 10 | 8.5 |
| Ex. 19 | Oleic Anhydride, neat | 1.5 | 8.9 |
| | | 5 | 12.9 |
| | | 10 | 12.0 |

Results indicate an improvement in performance between a direct dosed oleic anhydride and one emulsified with pH 10 DI water.

Conditions used for EXAMPLES 20-21 and Comparative Examples 12 and 13 (Demonstration of acyclic anhydride performance)
Temp=50 C
Precip time=18 hours
Liquor: Plant Liquor A
Seed: DF225 from RJ Marshall & Co. (60% fines, Alcoa-C31 equivalent)
Seed Charge: 50 g/L
CGM's: Oleic anhydride (TCI)—Acyclic anhydride
ODSA Formulation—Octadecenyl succinic anhydride (a cyclic anhydride) blended in a 75:25 wt by wt ratio with a mixture of polyethylene glycols and polypropylene glycols
Commercial Product C: comprising tall oil fatty acid Results for EXAMPLES 20-21 and Comparative Examples 12 and 13 are shown in Table 10, below.

TABLE 10

| | Crystal Growth Modifier | Dose as-is (ppm) | % Fines (<45 micron) | % Super Fines (<20 micron) | Yield (g/L) |
|---|---|---|---|---|---|
| C Ex. 12 | Blank | 0 | 7.5 | 0.1 | 64.9 |
| C Ex. 13 | Commercial Product C | 10 | 7.2 | 0.1 | 64.7 |
| | | 30 | 5.8 | 0.0 | 64.2 |
| | | 50 | 3.9 | 0.0 | 63.6 |
| Ex. 20 | 5% ODSA Formulation emulsion | 1.5 | 4.2 | 0.0 | 64.1 |
| | | 4.5 | 3.6 | 0.0 | 64.6 |
| | | 7.5 | 4.8 | 0.6 | 64.7 |
| Ex. 21 | Oleic Anhydride, 5% Emulsion-Acyclic anhydride | 1.5 | 4.9 | 0.0 | 64.3 |
| | | 4.5 | 3.7 | 0.0 | 64.5 |
| | | 7.5 | 5.3 | 0.1 | 64.7 |

As shown in Table 10, the performance comparison between ODSA, Commercial Product C and oleic anhydride for generation of fines (<45 um), superfines (<20 um) and impact on yield is observed. Note the decrease in yield observed when the competitive product is dosed at higher levels. The oleic anhydride does not decrease yield over the low dose range.

Examples 22-23 and Comparative Examples 14-15

Defoaming Properties

Spent liquor was reconstituted to pregnant liquor by adding alumina trihydrate and dissolving (as above, typical liquor composition is also the same). To 400 mL of hot pregnant liquor (90° C.), 50 g of fine hydrate seed (DF225, RJ Marshall) was added and shaken to achieve a solids concentration of 125 g/L. The resulting slurry was poured into a 1-L graduated cylinder placed in a water bath at 70° C. The slurry temperature was allowed to equilibrate to 70° C. and checked internally with a thermometer (~30 minutes). The slurry was kept in suspension by means of a magnetic stir bar place in the bottom of the graduated cylinder. The dose of the acyclic anhydride was then placed on the end of a stainless steel rod and immersed into the hot slurry, with agitation. The reagent was prepared as 5% oleic anhydride emulsion as described above. The treated slurry was then allowed to mix, come to equilibrium, for 2 minutes [a conditioning step]. A gas dispersion tube was then immersed in the slurry; the end of the tube was ~1 inch from the bottom of the cylinder. Air was then regulated through the tube into the liquor, generating bubbles through the dispersion device [sparger]. The height of the resulting foam head was then monitored as a function of time. By comparing the rate of foam generation of the chemically treated slurry to untreated slurry, the efficacy of the treatment to reduce foam was evaluated Conditions used for EXAMPLES 22-23 and Comparative Examples 14-15:
CGM: Oleic anhydride (TCI)—Acyclic anhydride
ODSA Formulation—Octadecenyl succinic anhydride (a cyclic anhydride) blended in a 75:25 wt by wt ratio with a mixture of polyethylene glycols and polypropylene glycols
Commercial Product D: comprising tall oil fatty acid
Liquor: Plant liquor A
Liquor slurry: Fine seed add to 125 g/L p0 Temperature: 70 C Results for EXAMPLES 22-23 and Comparative Examples 14-15 are shown in Table 11, below.

TABLE 11

| | Crystal Growth Modifier | Dose as-is (ppm) | Time (seconds) | Foam Height (mL) |
|---|---|---|---|---|
| C Ex. 14 | Blank | 0 | 30 | 600 |
| | | | 60 | 680 |
| | | | 65 | 700 |
| | | | 90 | 750 |
| | | | 120 | 800 |
| C Ex. 15 | Commercial Product D | 30 | 30 | 640 |
| | | | 60 | 660 |
| | | | 90 | 660 |
| | | | 120 | 600 |
| | | | 150 | 550 |
| | | | 180 | 540 |
| | | | 210 | 530 |
| | | | 240 | 530 |
| Ex. 22 | 5% Oleic Anhydride Emulsion-Acyclic anhydride | 4.5 | 30 | 700 |
| | | | 60 | 760 |
| | | | 90 | 700 |
| | | | 120 | 630 |
| | | | 150 | 600 |
| | | | 180 | 550 |
| | | | 210 | 550 |
| | | | 240 | 540 |
| Ex. 23 | 5% ODSA Formulation emulsion | 4.5 | 30 | 830 |
| | | | 60 | 940 |
| | | | 90 | 660 |
| | | | 120 | 520 |
| | | | 150 | 500 |
| | | | 180 | 500 |

Table 11 illustrates the defoaming performance of oleic anhydride, Commercial Product D and ODSA.

Conditions used for EXAMPLES 24- and Comparative Examples 16
Temp=50 C
Precip time=18 hours
Liquor: Plant Liquor A
Seed: DF225 from RJ Marshall & Co. (60% fines, Alcoa-C31 equivalent)
Seed Charge: 50 g/L
CGM's:
  ODSA Formulation—Octadecenyl succinic anhydride (a cyclic anhydride) blended in a 75:25 wt by wt ratio with a mixture of polyethylene glycols and polypropylene glycols
  2-Ethylhexanoic anhydride—(Acros Organics)
  Decanoic anhydride—(Acros Organics)
Results for EXAMPLES 24-28 and Comparative Examples 16 are shown in Table 12, below.

| | Reagent | Dose real (ppm) | % Fines (<45 micron) | % Super Fines (<20 micron) | Yield (g/L) |
|---|---|---|---|---|---|
| C Ex. 16 | Blank | 0 | 9.1 | 0.2 | 60.6 |
| Ex. 24 | 5% ODSA Formulation emulsion | 1.5 | 8.5 | 0.1 | 61.8 |
| | | 4.5 | 7.9 | 0.1 | 61.2 |
| | | 7.5 | 7.9 | 0.6 | 61.6 |
| Ex. 25 | 2-ethylhexanoic anhydride, neat | 1.5 | 10.6 | 0.2 | 61.2 |
| | | 4.5 | 11.1 | 0.3 | 61.3 |
| | | 7.5 | 15.5 | 0.9 | 62.6 |
| Ex. 26 | Decanoic anhydride, neat | 1.5 | 11.2 | 0.2 | 61.4 |
| | | 4.5 | 14.5 | 0.4 | 52.4 |
| | | 7.5 | 7.8 | 0.1 | 54.5 |
| Ex. 27 | 5% 2-ethylhexanoic anhydride emulsion | 1.5 | 9.4 | 0.1 | 61.6 |
| | | 4.5 | 9.4 | 0.1 | 61.7 |
| | | 7.5 | 7.8 | 0.1 | 58.3 |
| Ex. 28 | 5% Decanoic anhydride emulsion | 1.5 | 8 | 0.1 | 60.7 |
| | | 4.5 | 8.1 | 0.6 | 61.3 |
| | | 7.5 | 11.1 | 0.4 | 60.2 |

As shown in Table 11, the performance comparison between ODSA and 2-ethylhexanoic anhydride and decanoic anhydride dosed either directly or as 5 wt % emulsions is observed.

Unless indicated otherwise, concentrations of crystal growth modifier and defoamer in emulsions and doses in pregnant liquor are expressed on a "real" basis (i.e., the concentrations reflect the amount of active ingredient in solution). Unless indicated otherwise, concentration units are on a weight/volume basis (i.e., percent (%) is on a g/100 mL basis, and parts per million (ppm) is on a mg/L basis).

The defoamers described herein can have both anti-foam and defoaming properties (i.e., they can prevent foam and can reduce foam that is already formed, respectively).

As used herein, the terms "a" and "an" do not denote a limitation of quantity, but rather the presence of at least one of the referenced items. "Or" means "and/or" unless clearly indicated to the contrary by the context. Recitation of ranges of values are merely intended to serve as a shorthand method of referring individually to each separate value falling within the range, and each separate value is incorporated into this specification as if it were individually recited. Thus each range disclosed herein constitutes a disclosure of any subrange falling within the disclosed range. Disclosure of a narrower range or more specific group in addition to a broader range or larger group is not a disclaimer of the broader range or larger group. All ranges disclosed herein are inclusive of the endpoints, and the endpoints are independently combinable with each other. "Comprises" as used herein includes embodiments "consisting essentially of" or "consisting of" the listed elements.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of producing alumina trihydrate crystals from an alumina trihydrate recovery process stream, the method comprising:
  adding an aqueous emulsion comprising at least one acyclic anhydride to the alumina trihydrate recovery process stream to allow crystallization of the alumina trihydrate crystals from the alumina trihydrate recovery process stream, wherein the aqueous emulsion is substantially free of mineral oils and fuel oils, thereby providing a decrease in percentage of alumina trihydrate crystals having a volume average diameter of less than about 45 micrometers compared to the percentage of alumina trihydrate crystals produced in the absence of the aqueous emulsion comprising at least one acyclic anhydride.

2. The method according to claim 1 wherein the aqueous emulsion is substantially free of surfactants.

3. The method according to claim 1 wherein the aqueous emulsion is substantially free of defoamers or anti-foam agents.

4. The method according to claim 1 wherein the aqueous emulsion is substantially free of polyalkoxylated non-ionic surfactants, fatty acids, fatty acid salts or combinations thereof.

5. The method according to claim 1 wherein the aqueous emulsion has a volume average particle diameter of about 1 to about 100 micrometers.

6. The method according to claim 1 wherein the aqueous emulsion has a volume average particle diameter of about 1 to about 50 micrometers.

7. The method according to claim 1 wherein the acyclic anhydride has the structure:

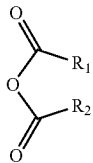

wherein $R_1$ and $R_2$ are each independently a $C_xH_y$ group, wherein x is an integer of from 1 to 30, and y is 2x−1 or 2x+1.

8. The method according to claim 7 wherein x is an integer of from 14 to 24.

9. The method according to claim 1 wherein the aqueous emulsion is substantially free of distillation bottoms from an oxo process.

10. The method according to claim 1 wherein the acyclic anhydride is selected from the group consisting of oleic anhydride, stearic anhydride, tetradecanoic anhydride, palmitic anhydride, arachidic anhydride, behenic anhydride, erucic anhydride, myristoleic anhydride, decanoic anhydride, 2-ethylhexanoic anhydride, palmitoleic anhydride and any combination thereof.

11. The method according to claim 1 wherein the alumina trihydrate recovery process stream is a caustic Bayer process stream.

12. The method according to claim 1 wherein the aqueous emulsion is added after red mud separation and prior to isolation of alumina trihydrate crystals.

13. The method according to claim 1 wherein the aqueous emulsion is prepared with a high shear mixer.

14. The method according to claim 1 wherein the acyclic anhydride is added at a dose of from about 0.1 to about 100 milligrams per liter of alumina trihydrate recovery process stream.

15. The method according to claim 1 wherein the aqueous emulsion comprises from about 1 to about 20 milligrams per 100 milliliters of acyclic anhydride.

16. The method according to claim 1 wherein alumina trihydrate yield after about 5 hours crystallizing time is not decreased by addition of the aqueous emulsion to the alumina trihydrate recovery process stream.

* * * * *